(12) United States Patent
Klesse et al.

(10) Patent No.: US 11,029,229 B2
(45) Date of Patent: Jun. 8, 2021

(54) METHOD FOR CHECKING THE PLAUSIBILITY OF THE FUNCTION OF A PRESSURE SENSOR

(71) Applicant: CONTINENTAL AUTOMOTIVE GMBH, Hannover (DE)

(72) Inventors: Christoph Klesse, Wörth A.D.Donau (DE); Tobias Ritsch, Regensburg (DE); Claus Stephani, Pfatter (DE); Thomas Uliana, Donaustauf (DE)

(73) Assignee: Vitesco Technologies GmbH, Hannover (DE)

( * ) Notice: Subject to any disclaimer, the term of this patent is extended or adjusted under 35 U.S.C. 154(b) by 502 days.

(21) Appl. No.: 15/883,984

(22) Filed: Jan. 30, 2018

(65) Prior Publication Data

US 2018/0149543 A1 May 31, 2018

Related U.S. Application Data

(63) Continuation of application No. PCT/EP2016/067449, filed on Jul. 21, 2016.

(30) Foreign Application Priority Data

Jul. 31, 2015 (DE) ...................... 10 2015 214 589.1

(51) Int. Cl.
*G01L 27/00* (2006.01)
*F02D 41/24* (2006.01)
(Continued)

(52) U.S. Cl.
CPC ........ *G01L 27/007* (2013.01); *F02D 41/2096* (2013.01); *F02D 41/2438* (2013.01);
(Continued)

(58) Field of Classification Search
CPC ..... G01L 27/007; G01L 9/00; F02D 41/2438; F02D 41/2096; F02D 41/2474;
(Continued)

(56) References Cited

U.S. PATENT DOCUMENTS

2006/0224299 A1 10/2006 Cochet et al.
2007/0028895 A1 2/2007 Fujii
(Continued)

FOREIGN PATENT DOCUMENTS

CN 1807862 A 7/2006
CN 101151452 A 3/2008
(Continued)

OTHER PUBLICATIONS

Ip.com Prior Art Search list.*
(Continued)

*Primary Examiner* — Peter J Macchiarolo
*Assistant Examiner* — Anthony W Megna Fuentes

(57) ABSTRACT

A method according to the invention for checking the plausibility of the function of a pressure sensor in an injection system of an internal combustion engine includes acquiring a calibrated actuation profile, by which peak current values for opening at least one electrically actuatable injection valve are assigned to existing internal pressures. An existing internal pressure is measured in the form of an actual sensor pressure value by the pressure sensor. The method includes obtaining the electrical peak current value corresponding to the measured sensor pressure value from a calibrated actuation profile, such that the corresponding electrical peak current value acquired in this way is applied to the injection valve. Subsequently, an opening state of the injection valve is monitored in reaction to the applied (Continued)

electrical peak current value, and a functional state of the pressure sensor is assigned as a function of the opening state of the injection valve.

18 Claims, 3 Drawing Sheets

(51) Int. Cl.
*F02M 63/00* (2006.01)
*F02D 41/20* (2006.01)
*F02M 57/00* (2006.01)
*G01L 9/00* (2006.01)
*F02D 41/22* (2006.01)

(52) U.S. Cl.
CPC ....... *F02D 41/2474* (2013.01); *F02M 57/005* (2013.01); *F02M 63/0026* (2013.01); *G01L 9/00* (2013.01); *F02D 2041/223* (2013.01); *F02D 2041/224* (2013.01); *F02D 2200/0602* (2013.01); *F02D 2200/0604* (2013.01)

(58) Field of Classification Search
CPC ....... F02D 2200/0604; F02D 2041/224; F02D 2200/0602; F02D 2041/223; F02D 41/40; F02D 19/061; F02D 19/0628; F02M 63/0026; F02M 57/005
See application file for complete search history.

(56) References Cited

U.S. PATENT DOCUMENTS

| | | |
|---|---|---|
| 2009/0019926 A1 | 1/2009 | Sommerer |
| 2011/0016959 A1 | 1/2011 | Hermes et al. |
| 2013/0080032 A1 | 3/2013 | Kaneko et al. |
| 2015/0153242 A1* | 6/2015 | Jenne .................. F02D 41/3863 73/1.69 |

FOREIGN PATENT DOCUMENTS

| | | |
|---|---|---|
| CN | 101983284 A | 3/2011 |
| DE | 102006000021 A1 | 8/2006 |
| DE | 602005004892 T2 | 3/2009 |
| DE | 102008000983 A1 | 10/2009 |
| DE | 102008040244 A1 | 1/2010 |
| DE | 102013201576 A1 | 7/2014 |
| DE | 102013213698 A1 | 1/2015 |
| EP | 2014900 A1 | 1/2009 |
| EP | 2317102 A2 | 5/2011 |
| EP | 2489870 A1 | 8/2012 |

OTHER PUBLICATIONS

Ip.com Prior art search—PgPUB.*
Ip.com Prior art search—Search query.*
International Search Report and Written Opinion dated Oct. 24, 2016 from corresponding International Patent Application No. PCT/EP2016/067449.
German Office Action dated Jul. 12, 2016 for corresponding German Patent Application No. 10 2015 214 589.1.
Chinese First Office Action dated Aug. 11, 2020 for the counterpart Chinese Patent Application No. 20160045113.0.

* cited by examiner

METHOD FOR CHECKING THE PLAUSIBILITY OF THE FUNCTION OF A PRESSURE SENSOR

CROSS REFERENCE TO RELATED APPLICATIONS

This application claims the benefit of International application No. PCT/EP2016/067449, filed Jul. 21, 2016, which claims priority to German patent application No. 10 2015 214 589.1, filed Jul. 31, 2015, each of which is hereby incorporated by reference in its entirety.

FIELD OF INVENTION

The invention relates to a method for checking the plausibility of the function of a pressure sensor of an injection system of an internal combustion engine.

BACKGROUND

Modern internal combustion engines are provided with an injection system with which fuel is fed from the low-pressure region by means of a high-pressure pump into a pressure accumulator (common rail) and is pressurized. In the case of gasoline fuel, for example a pressure of 150 to 200 bar, and in the case of diesel fuel a pressure of, for example, 1500 to 2000 bar, is present in the high-pressure accumulator. A plurality of injection valves branch off from the high-pressure accumulator, which injection valves inject, given corresponding actuation, the fuel from the high-pressure accumulator with the injection pressure present there into the combustion chambers of the internal combustion engine.

The injection valves can be actuated as a function of specific operating characteristic variables. In this context, the injection valves are not continuously supplied with constant current but rather operated in a clocked fashion. The clocking of the current is carried out here in such a way that the injection valves are actuated by means of a relatively high current surge (referred to as "peak current"), in order to ensure reliable and rapid injection.

In the high-pressure accumulator, the injection pressure is monitored by a sensor. The sensor acquires the injection pressure which is present in the high-pressure accumulator and, as a function of the measured pressure, sends a corresponding electrical signal to an engine controller of the internal combustion engine, as a result of which the injection valve of the injection system is open-loop and/or closed-loop controlled. The pressure signal of the pressure sensor which is processed in the engine controller is therefore the control parameter for controlling the injection pressure. This control is important for ensuring the legally regulated internal combustion emissions, since the injection pressure constitutes an internal combustion parameter.

It may be the case that the pressure sensor itself is operating in a faulty way, wherein the pressure sensor may, in particular, have an offset, as a result of which the measured value of the pressure sensor may have large relative deviations with respect to the actual pressure value. A malfunction of the pressure sensor or a drift behavior during operation and over the service life of the pressure sensor has a negative effect on the accuracy of the setpoint pressure to be set, and as a result on the accuracy of the injection quantity. This results in faults in the injected fuel quantity, as a result of which significant worsening of emission and driving properties occur. The plausibility of the pressure values which are specified by the pressure sensor therefore has to be checked.

In addition, component faults occurring in the injection system frequently give rise to undesired vehicle behavior such as a poor, or no longer possible, engine start. In the case of starting problems, on-board diagnostic systems only permit the precise cause of a fault in the injection system to be determined to a limited degree, for example in the case of an electrical short-circuit, without intervening actively in the system. This applies, in particular, also to a defective pressure sensor which has, e.g., an "offset" but is free of electrical faults. In the case of such a fault, it is not possible to differentiate whether, for example, a valve or the pressure sensor is currently defective.

Hitherto, performing plausibility checking on the pressure sensor by comparison with known pressures such as, for example, the ambient pressure in the pressureless state of the system, has been known from the prior art. However, this method can be carried out only to a restricted degree in the case of very long stationary times of the vehicle and also does not permit any conclusion to be drawn as to what extent the pressure sensor does not have what is referred to as a "gain error" and is correspondingly supplying measurements which deviate from the actual system pressure in the measuring range which is outside the ambient pressure.

Alternatively, redundant monitoring of the pressure sensor signal during the pressure measurement is possible, wherein a continuous comparison of two sensor signals in the entire measuring range has to be carried out. Deviation of the two signals from one another makes it possible to assume there is a fault and makes possible a corresponding system reaction, wherein such a fault detection by the arrangement of two pressure sensors is very costly.

Previous sensor monitoring operations have taken place to a limited degree and only in a pressureless injection system, wherein the actual sensor measuring range and sensor working range is not checked. It has to be assumed here that a gain error and/or an offset error of the pressure sensor does not occur.

SUMMARY

Embodiments of the present invention are based on disclosing a method which makes it possible to check the plausibility of the function of a pressure sensor in an easy and reliable way, wherein, in particular, malfunctions of pressure sensors are indicated in close to real-time conditions, and measured values are reliably monitored and largely minimized.

According to a first aspect, a method for checking the plausibility of the function of a pressure sensor of an injection system of an internal combustion engine is specified, wherein the injection system has a high-pressure pump for feeding fuel from a low-pressure region into a high-pressure region, at least one electrically actuatable injection valve for injecting the fuel from the high-pressure region into combustion chambers of the internal combustion engine, and the pressure sensor for measuring an internal pressure in the high-pressure region.

A method, according to an embodiment of the invention, for checking the plausibility of the function of a pressure sensor of an injection system of an internal combustion engine includes steps wherein in a first step a calibrated actuation profile is acquired, by means of which peak current values, which are necessary for opening the at least one electrically actuatable injection valve, may be assigned to existing internal pressures. In a second step, an existing internal pressure is measured in the form of an actual sensor pressure value by means of the pressure sensor.

A third step includes obtaining the electrical peak current value corresponding to the measured sensor pressure value from the calibrated actuation profile, with the result that in a fourth step, the corresponding electrical peak current value acquired in this way may be applied to the injection valve. Subsequently, in a fifth step an opening state of the injection valve is monitored in reaction to the applied electrical peak current value, and in a sixth step, a functional state of the pressure sensor is assigned as a function of the opening state of the injection valve. In this way, a possible offset error and/or gain error of the pressure sensor during operation may be successfully detected.

The functional state "downward deviation of the measurement" may advantageously be assigned to the pressure sensor when opening of the injection valve fails to take place as a result of the applied electrical peak current value.

In one embodiment, the functional state "no downward deviation of the measurement" may be assigned to the pressure sensor when opening of the injection valve has taken place as a result of the applied electrical peak current value.

In another variant, the method has additional steps, wherein in a seventh step, previous defined operating points of the internal combustion engine are defined, and in an eighth step incremental reduction of the electrical peak current value with respect to the calibrated actuation profile occurs, and the reduced peak current value is applied to the injection valve if the internal combustion engine is in a defined operating point. Subsequently, in a ninth step, assigned monitoring of the opening state of the injection valve is carried out in reaction to the applied reduced electrical peak current value, and in a tenth step a functional state of the pressure sensor is again assigned as a function of the opening state of the injection valve.

The functional state "upward deviation of the measurement" may be assigned to the pressure sensor when opening of the injection valve has taken place as a result of the applied reduced electrical peak current value.

The functional state "no upward deviation of the measurement" may be assigned to the pressure sensor when opening of the injection valve fails to take place as a result of the applied reduced electrical peak current value.

In one embodiment, the functional state "plausible" is stored in the engine controller if "no upward deviation of the measurement" and "no downward deviation of the measurement" are assigned to the pressure sensor as a result of the applied reduced electrical peak current value.

The calibrated actuation profile may be acquired in the form of a table, wherein discrete necessary peak current values are assigned to discrete voltage values of the pressure sensor. Wherein in an alternative embodiment, the calibrated actuation profile may be acquired in the form of a functional relationship between the internal pressure and the peak current value which is necessary for opening the at least one electrically actuatable injection valve.

In an embodiment, the acquired "faulty" functional states, such as, for example, the "upward deviation of the measurement" and the "downward deviation of the measurement," are stored as fault messages in the engine controller.

The method, according to an embodiment of the invention, may be provided in a device for controlling an injection system of an internal combustion engine. Accordingly, a device, in particular an engine controller for compensating a fault of a pressure sensor of an injection system of an internal combustion engine, also forms a further aspect, wherein the control device is configured to carry out the method described above.

The method, according to an embodiment of the invention, may be provided in a motor vehicle. Accordingly, a motor vehicle having an internal combustion engine which is equipped with an injection system as described above also forms a further aspect, wherein the motor vehicle has an engine controller for carrying out the method described above.

Further features, application possibilities and advantages of the invention may be found in the following description of the embodiment of the invention which is illustrated in the figures. It is to be noted here that the presented features have only a descriptive character and may also be used in combination with features of other developments described above and are not to be considered to restrict the invention in any form.

BRIEF DESCRIPTION OF THE DRAWINGS

The invention will now be described more precisely with respect to the appended figures. In the drawings, in each case in schematic form.

DETAILED DESCRIPTION

Figure 1:
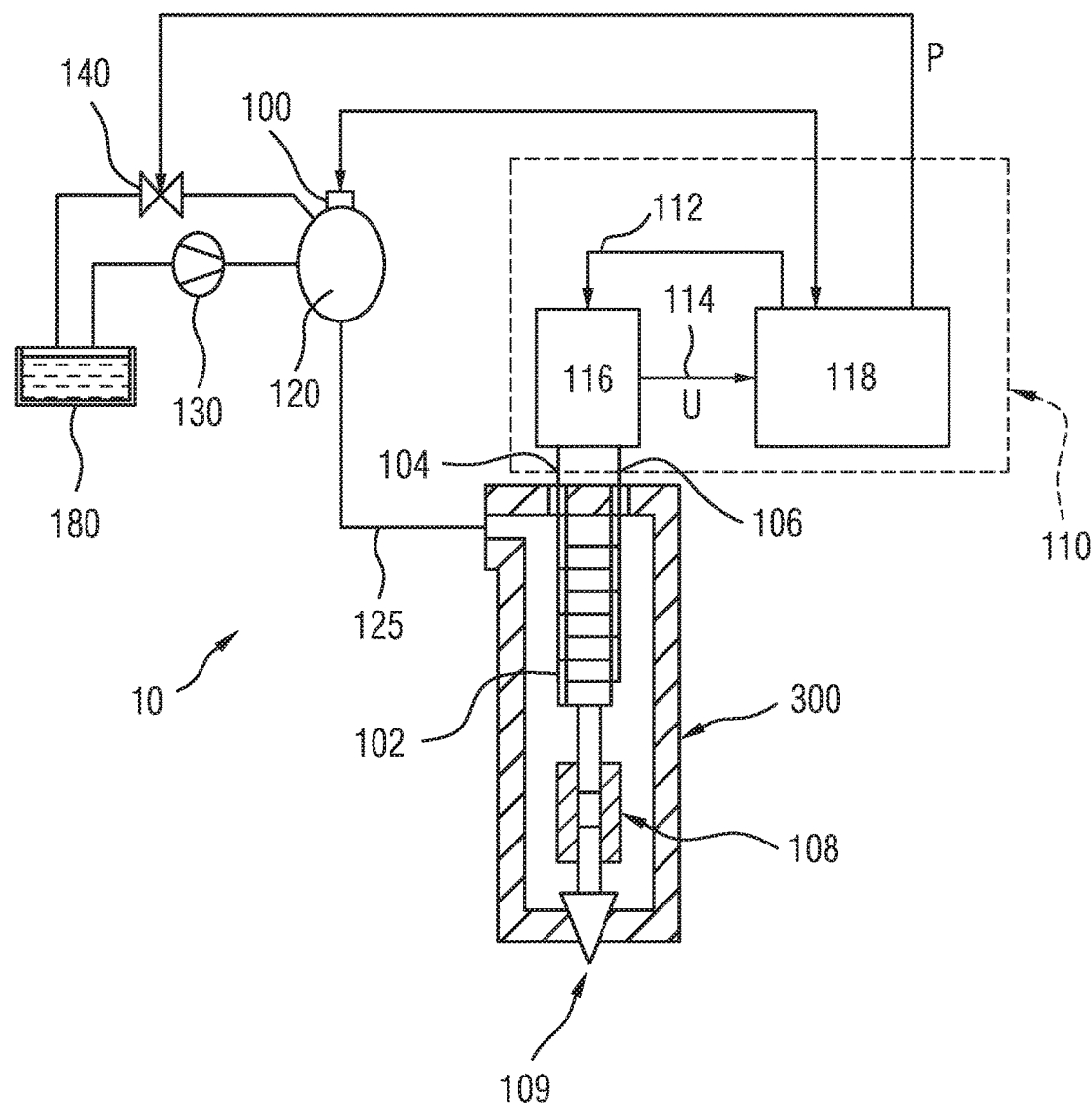
FIG. 1 shows an accumulator-type injection system which performs a method for checking the plausibility of the function of a pressure sensor of an injection system of an internal combustion engine, according to an embodiment of the invention.

FIG. 1 shows an accumulator-type injection system 10 which has an injection valve 300, an engine controller 110, a fuel high-pressure accumulator 120, a fuel tank 180, a high-pressure pump 130, as well as a pressure sensor 100 and a pressure control valve 140. The injection valve 300 is connected to the high-pressure accumulator 120 via a high-pressure line 125, with the result that the same pressure is statically present in its interior as in the high-pressure accumulator 120. In the interior of the injection valve 300, a piezo actuator 102 is arranged which is implemented as a stack of n layers of piezo-electric material which are each located electrically between a first connection 104 and a second connection 106.

The piezo actuator 102 is connected to a nozzle needle 109 via a hydraulic coupler 108 and is controlled by the engine controller 110. The engine controller 110 has power and measuring electronics 116 and a control part 118. The control intervention in the power and measuring electronics 116 is represented in FIG. 1 by the arrow 112. The arrow 114 represents a transfer of a voltage U, detected by the power and measuring electronics 116, to the control part 118. The charging and discharging of the piezo actuator 102 take place via the connections 104 and 106. The fuel pressure p in the fuel high-pressure accumulator 120 or some other part of the accumulator-type injection system 10 which conducts fuel under high pressure is detected by the pressure sensor 100 and transmitted to the engine controller 110.

As is illustrated in basic form in FIG. 1, the piezo actuator 102 acts with a change in length directly on the nozzle needle 109 via the hydraulic coupler 108. The nozzle needle 109 is fixedly seated on its seat when the piezo actuator 102 is charged and therefore extended. The closing force is generated here by the pressure in the coupler space. If the piezo actuator 102 is discharged, it retracts and relieves the nozzle needle 109 of loading via the hydraulic coupler 108 which is filled with fuel. The injection pressure which is present at a pressure shoulder of the nozzle needle 109 continuously generates an opening force which acts on the nozzle needle 109. When the piezo actuator 102 discharges, the pressure in the coupler 108 drops below the value of the opening force, which causes the nozzle needle 109 to lift off from its seat and therefore brings about an injection of fuel.

Figure 2:
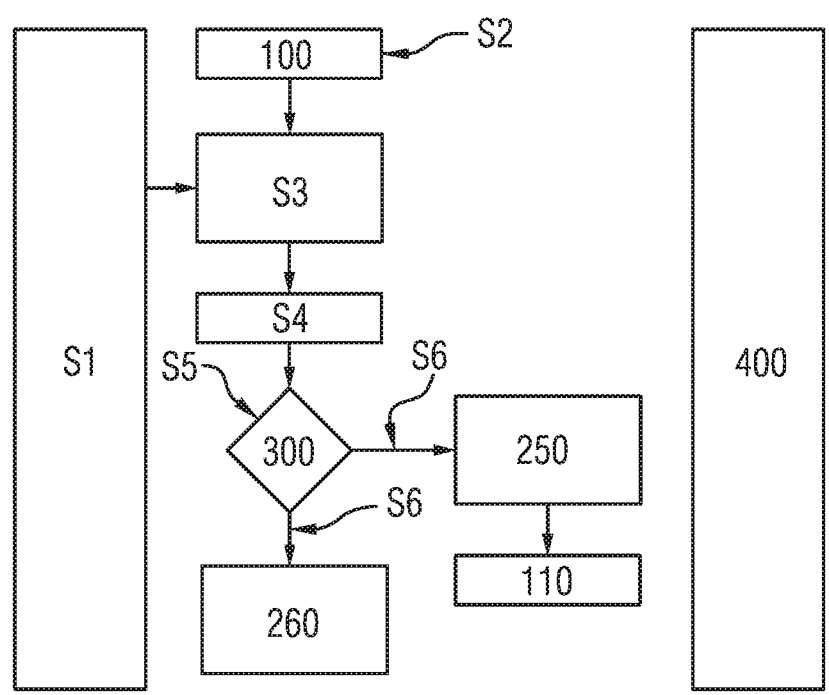
FIG. 2 shows a first variant of a method for checking the plausibility of the function of a pressure sensor of an injection system of an internal combustion engine, according to an example embodiment.

FIG. 2 shows a first variant of a method sequence, according to an embodiment of the invention, for checking the plausibility of the function of a pressure sensor 100 of an injection system 10 of an internal combustion engine. The method according, to the embodiment of the invention, is started in step S1, wherein a calibrated actuation profile is acquired. On the basis thereof, peak current values $I_{peak,min}$ which are necessary for opening the at least one electrically actuatable injection valve 300 may be assigned to the internal pressures which are present in a high-pressure accumulator 120. In step S2, a measured actual sensor pressure value is measured by means of the pressure sensor 100. Then, in step S3, the electrical peak current value $I_{peak,k}$ corresponding to the measured actual sensor pressure value is obtained by means of the calibrated actuation profile, with the result that in step S4 the acquired corresponding electrical peak current value $I_{peak,k}$ is applied to the injection valve 300. Subsequently, in step S5, an opening state of the injection valve 300 is monitored in reaction to the applied electrical peak current value $I_{peak,k}$, and in step S6 a functional state is assigned to the pressure sensor 100 as a function of the opening state of the injection valve 300.

If the injection valve 300 is opened as a result of the applied electrical peak current value $I_{peak,k}$, the functional state "no downward deviation" 260 is assigned to the pressure sensor 100.

The functional state "downward deviation of the measurement" 250 is assigned to the pressure sensor 100 when opening of the injection valve 300 fails to take place as a result of the applied electrical peak current value $I_{peak,k}$, wherein when the functional state "downward deviation of the measurement" 250 is acquired, a fault message is stored in the engine controller 110. In addition, it is conceivable that the fault message is communicated to a vehicle driver, with the result that the driver can check the fault in a workshop.

Figure 3:
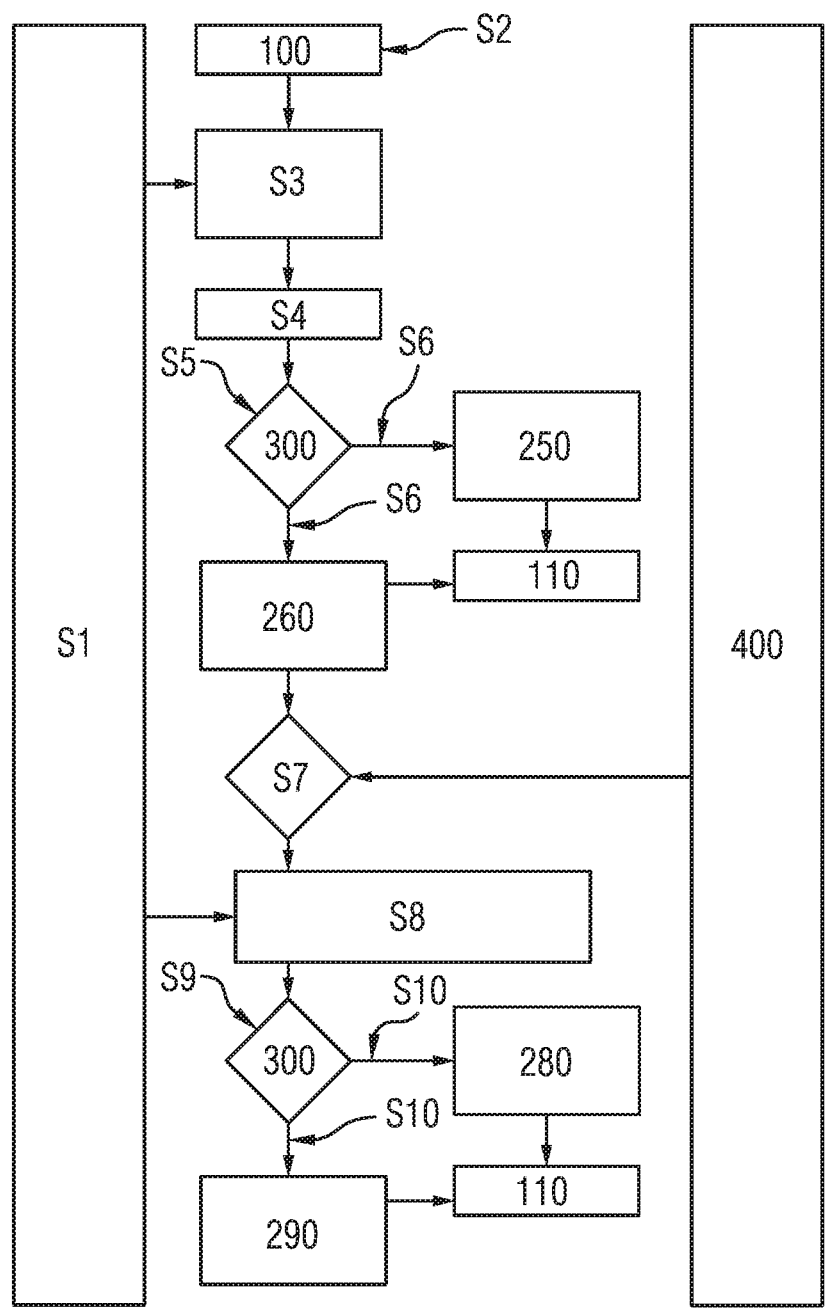
FIG. 3 shows a second variant of a method for checking the plausibility of the function of a pressure sensor of an injection system of an internal combustion engine, according to an example embodiment.

FIG. 3 shows a second variant of a method sequence, according to an example embodiment of the invention, for checking the plausibility of the function of a pressure sensor of an injection system of an internal combustion engine. In this method, further method steps follow the method sequence illustrated in FIG. 2. After the functional state "no downward deviation" 260 has been assigned to the pressure sensor 100 in step S6 in an opening of the injection valve 300 as a result of the applied electrical peak current value $I_{peak,k}$, although it is clear that fuel is injected it is not possible to draw a conclusion about a possible upward deviation of the measurement. Basically, it would also be conceivable that the applied electrical peak current value $I_{peak,k}$ was too high. For checking of the pressure sensor 100 in this regard, in step S7 a defined operating point 400, such as, for example, the idling mode, of the internal combustion engine is defined. Subsequently, in step S8 incremental reduction of the electrical peak current value $I_{peak,a}$ with respect to the calibrated actuation profile may take place and the reduced peak current value $I_{peak,a}$ may be applied to the injection valve 300 if the internal combustion engine is in a defined operating point 400, for example in the idling mode. Then, in step S9, an assigned monitoring of the opening state of the injection valve 300 is carried out in reaction to the applied reduced electrical peak current value $I_{peak,a}$. Finally, in step S10 a functional state of the pressure sensor 100 is again assigned to the pressure sensor 100 as a function of the opening state of the injection valve 300, wherein the functional state "no upward deviation" 280 is assigned to the pressure sensor 100 when opening of the injection valve 300 fails to take place as a result of the applied reduced electrical peak current value $I_{peak,a}$.

In contrast, the functional state "upward deviation of the measurement" 290 is assigned to the pressure sensor 100 when opening of the injection valve 300 has taken place as a result of the applied reduced electrical peak current value $I_{peak,a}$, after which a fault message is stored in the engine controller 110 and is also communicated to the vehicle driver, with the result that the driver can check the fault in a workshop.

The functional state "plausible" is stored in the engine controller 110 if "no upward deviation of the measurement" 280 and "no downward deviation of the measurement" 260 may be assigned to the pressure sensor 100 as a result of the applied reduced electrical peak current value $I_{peak,a}$.

The calibrated actuation profile may be acquired in the form of a table, wherein discrete necessary peak current values $I_{peak,min}$ are assigned to discrete voltage values of the pressure sensor. Alternatively, it would also be possible to acquire the calibrated actuation profile in the form of a functional relationship between the internal pressure and the peak current value $I_{peak,min}$ which is necessary for opening the at least one electrically actuatable injection valve 300.

A number of implementations have been described. Nevertheless, it will be understood that various modifications may be made without departing from the spirit and scope of the disclosure. Accordingly, other implementations are within the scope of the following claims.

LIST OF REFERENCE SIGNS

10 Accumulator-type injection system
100 Pressure sensor
102 Piezo actuator
104 First connection
106 Second connection
108 Hydraulic coupler
109 Nozzle needle
110 Engine controller
112 Arrow
116 Power and measuring electronics
118 Control part
120 Fuel high-pressure accumulator
125 High-pressure line
130 High-pressure pump
140 Pressure control valve
250 Functional state "downward deviation of the measurement"
260 Functional state "no downward deviation"
280 Functional state "no upward deviation"
290 Functional state "upward deviation of the measurement"
300 Injection valve
400 Defined operating point Ipeak,k Applied electrical peak current value
Ipeak,min Necessary peak current value
Ipeak,a Applied reduced peak current value

The invention claimed is:

1. A method for checking the plausibility of a function of a pressure sensor of an injection system of an internal combustion engine, wherein the injection system has a high-pressure pump for feeding fuel from a low-pressure region into a high-pressure region, at least one electrically actuatable injection valve for injecting the fuel from the high-pressure region into combustion chambers of the internal combustion engine, and the pressure sensor for measuring an internal pressure in the high-pressure region, the method comprising: acquiring a calibrated actuation profile by which peak current values, for opening the at least one electrically actuatable injection valve, of a current profile of a control current of the at least one electrically actuatable injection valve are assigned to existing internal pressures present in the high-pressure region; measuring an existing internal pressure in the form of an actual sensor pressure value by the pressure sensor; obtaining the electrical peak current value corresponding to the measured actual sensor pressure value from the calibrated actuation profile; applying the obtained electrical peak current value to the at least one electrically actuatable injection valve; and assigning a functional state of the pressure sensor as a function of a opening state of the at least one electrically actuatable injection valve monitored in reaction to the applied electrical peak current value.

2. The method as claimed in claim 1, further comprising assigning to the pressure sensor a functional state indicating downward deviation of the internal pressure measurement when opening of the at least one electrically actuatable injection valve fails to take place as a result of the applied electrical peak current value.

3. The method as claimed in claim 2, further comprising storing a fault message in an engine controller of the internal combustion engine when the functional state indicating downward deviation of the internal pressure measurement is assigned.

4. The method as claimed in claim 1, further comprising assigning a functional state indicating no downward deviation of the internal pressure measurement to the pressure sensor when opening of the at least one electrically actuatable injection valve has taken place as a result of the applied electrical peak current value.

5. The method as claimed in claim 1, further comprising: defining operating points of the internal combustion engine; incrementally reducing the electrical peak current value with respect to the calibrated actuation profile and applying the reduced peak current value to the at least one electrically actuatable injection valve when the internal combustion engine is operating at a defined operating point; and assigning a functional state of the pressure sensor as a function of a monitored opening state of the at least one electrically actuatable injection valve in reaction to the reduced electrical peak current value.

6. The method as claimed in claim 5, further comprising assigning a functional state indicating upward deviation of the internal pressure measurement to the pressure sensor when opening of the at least one electrically actuatable injection valve has taken place as a result of the reduced electrical peak current value.

7. The method as claimed in claim 6, further comprising storing a fault message in an engine controller when the functional state indicating upward deviation of the internal pressure measurement is acquired.

8. The method as claimed in claim 5, further comprising assigning a functional state indicating no upward deviation of the internal pressure measurement to the pressure sensor when opening of the at least one electrically actuatable injection valve fails to take place as a result of the reduced electrical peak current value.

9. The method as claimed in claim 5, further comprising storing a functional state indicating plausible in the engine controller when the functional states indicating no upward deviation of the internal pressure measurement and no downward deviation of the internal pressure measurement are assigned to the pressure sensor as a result of the reduced electrical peak current value.

10. The method as claimed in claim 1, wherein the calibrated actuation profile is in the form of a table, wherein discrete peak current values are assigned to discrete voltage values of the pressure sensor.

11. The method as claimed in claim 1, wherein the calibrated actuation profile is in the form of a functional relationship between the internal pressure present in the high-pressure region and the electrical peak current value which for opening the at least one electrically actuatable injection valve.

12. A device controlling an injection system of an internal combustion engine for checking the plausibility of a function of a pressure sensor of an injection system of an internal combustion engine, wherein the injection system has a high-pressure pump configured for feeding fuel from a low-pressure region into a high-pressure region, at least one electrically actuatable injection valve, actuatable as a function of operating characteristic variables, configured for injecting the fuel from the high-pressure region into combustion chambers of the internal combustion engine, and the pressure sensor configured for measuring an internal pressure in the high-pressure region, the device comprising:
an engine controller, wherein the engine controller is configured to:
acquire a calibrated actuation profile by which peak current values, for opening the at least one electrically actuatable injection valve, of a current profile of a control current of the at least one electrically actuatable injection valve are assigned to existing internal pressures present in the high-pressure region;
measure an existing internal pressure in the form of an actual sensor pressure value by the pressure sensor;
obtain the electrical peak current value corresponding to the measured actual sensor pressure value from the calibrated actuation profile;
apply the obtained electrical peak current value to the at least one electrically actuatable injection valve; and
assign a functional state of the pressure sensor as a function of an opening state of the at least one electrically actuatable injection valve monitored in reaction to the applied electrical peak current value.

13. The device of claim 12, wherein the engine controller is further configured to assign a functional state indicating downward deviation of the internal pressure measurement to the pressure sensor when opening of the at least one electrically actuatable injection valve fails to take place as a result of the applied electrical peak current value, and to store a fault message in the engine controller when the functional state indicating downward deviation of the internal pressure measurement is assigned.

14. The device of claim 12, wherein the engine controller is further configured to assign a functional state indicating no downward deviation of the internal pressure measurement to the pressure sensor when opening of the at least one electrically actuatable injection valve has taken place as a result of the applied electrical peak current value.

15. The device of claim 12, wherein the engine controller is further configured to:
define operating points of the internal combustion engine;
incrementally reduce the electrical peak current value with respect to the calibrated actuation profile and applying the reduced electrical peak current value to the at least one electrically actuatable injection valve when the internal combustion engine is in a defined operating point; and
and
assign a functional state of the pressure sensor as a function of the opening state of the at least one electrically actuatable injection valve monitored in reaction to the reduced electrical peak current value.

16. The device of claim 15, wherein the engine controller is further configured to assign a functional state indicating upward deviation of the internal pressure measurement to the pressure sensor when opening of the at least one electrically actuatable injection valve has taken place as a result of the reduced electrical peak current value, and to store a fault message in the engine controller when the functional state indicating upward deviation of the internal pressure measurement is acquired.

17. The device of claim 15, wherein the engine controller is further configured to assign a functional state indicating no upward deviation of the internal pressure measurement to the pressure sensor when opening of the at least one electrically actuatable injection valve fails to take place as a result of the reduced electrical peak current value, and to store a functional state indicating plausible in the engine controller when the functional states indicating no upward deviation of the internal pressure measurement and no downward deviation of the internal pressure measurement are assigned to the pressure sensor as a result of the reduced electrical peak current value.

18. A motor vehicle having an internal combustion engine with an injection system, wherein the injection system has a high-pressure pump configured for feeding fuel from a low-pressure region into a high-pressure region, at least one electrically actuatable injection valve, actuatable as a function of operating characteristic variables, configured for injecting the fuel from the high-pressure region into combustion chambers of the internal combustion engine, and has a pressure sensor configured for measuring a pressure in the high-pressure region, wherein the motor vehicle includes an engine controller, wherein the engine controller is configured to:
acquire a calibrated actuation profile by which peak current values, for opening the at least one electrically actuatable injection valve, of a current profile of the control current of the at least one electrically actuatable injection valve are assigned to existing internal pressures present in the high-pressure region;
measure an existing internal pressure in the form of an actual sensor pressure value by the pressure sensor;
obtain the electrical peak current value corresponding to the measured actual sensor pressure value from the calibrated actuation profile;
apply the obtained electrical peak current value to the at least one actuatable injection valve;
and
assign a functional state of the pressure sensor as a function of an opening state of the at least one electrically actuatable injection valve monitored in reaction to the applied electrical peak current value.

* * * * *